March 10, 1964 TAKEO MANO 3,124,344
AUTOMATIC DOOR OPERATING DEVICE
Filed Dec. 5, 1960 5 Sheets-Sheet 2
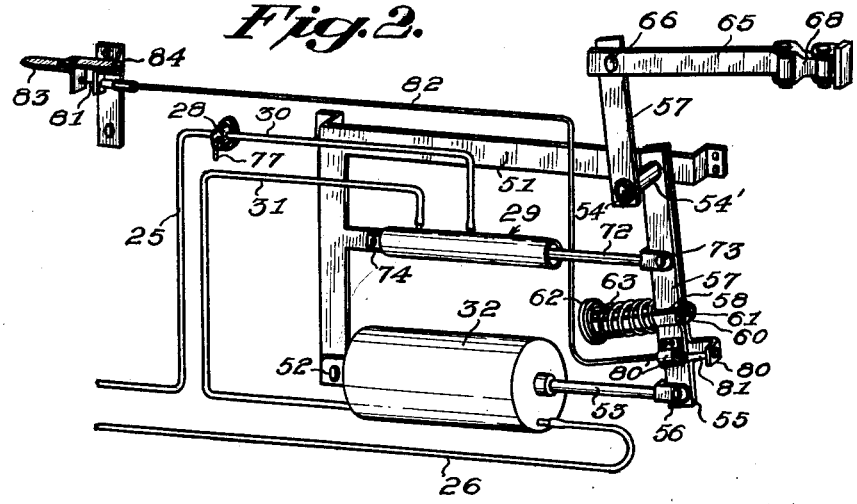
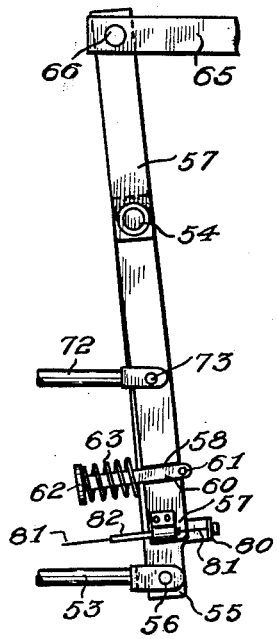
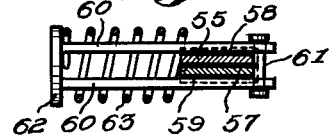
INVENTOR
Takeo Mano
Chandlee Pidgeon
AGENT INVENTOR
Takeo Mano.
AGENT March 10, 1964  TAKEO MANO  3,124,344
AUTOMATIC DOOR OPERATING DEVICE
Filed Dec. 5, 1960  5 Sheets-Sheet 4
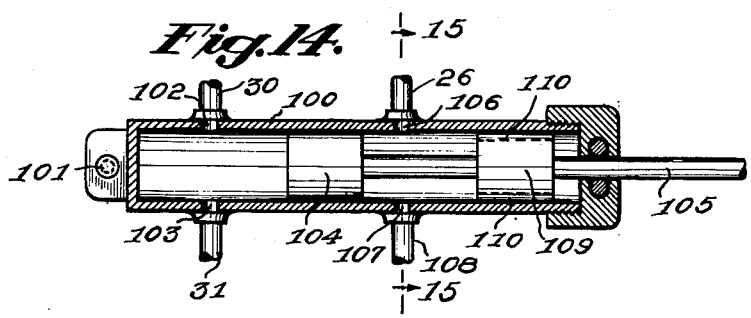
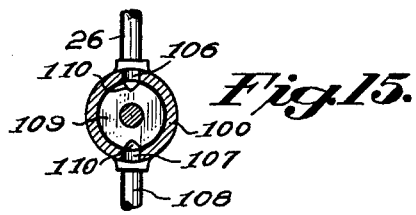
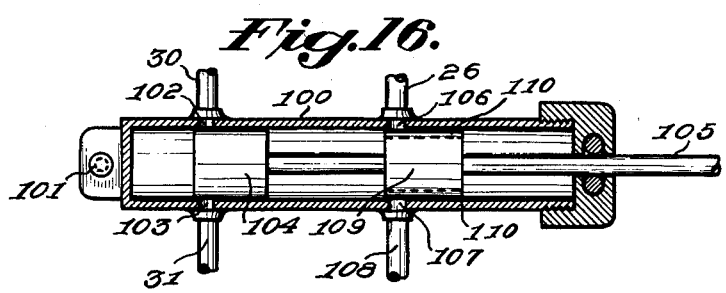
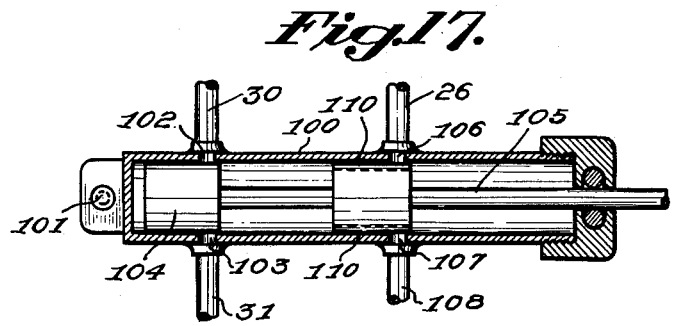
INVENTOR
Takeo Mano
AGENT March 10, 1964 TAKEO MANO 3,124,344
AUTOMATIC DOOR OPERATING DEVICE
Filed Dec. 5, 1960 5 Sheets-Sheet 5
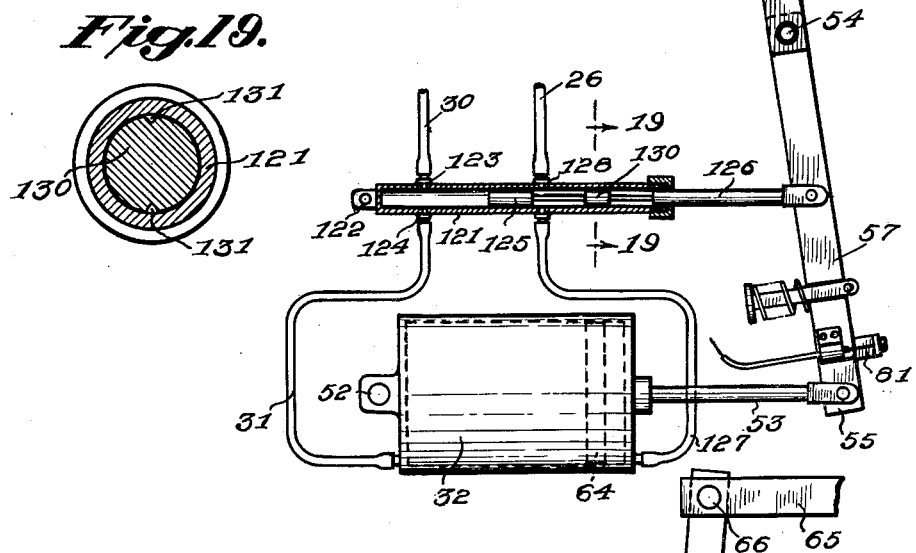
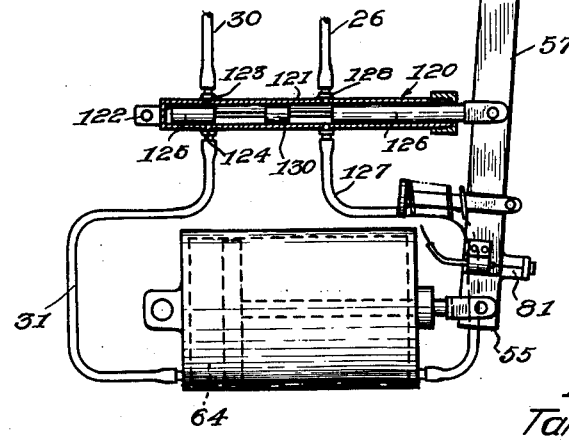
INVENTOR
Takeo Mano.
AGENT

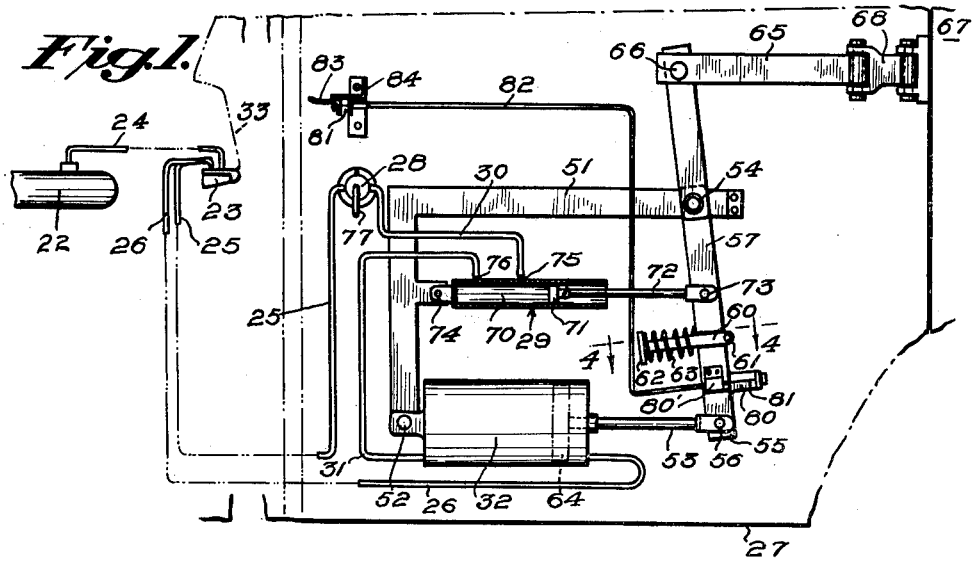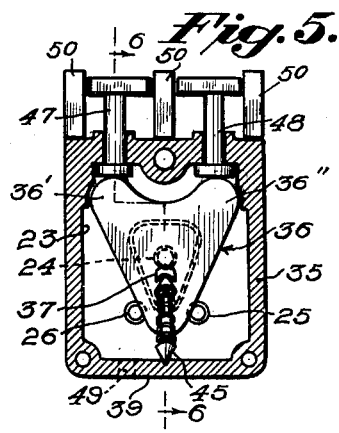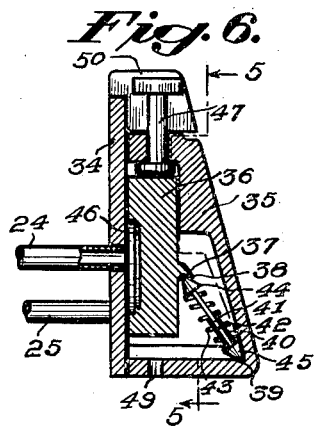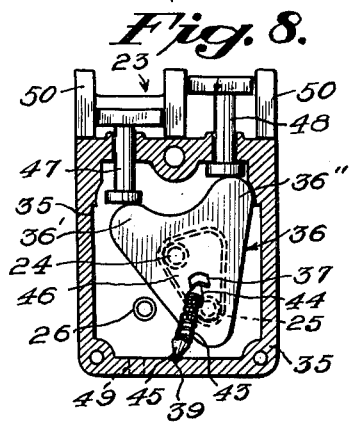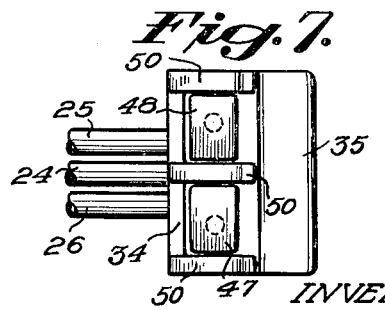

United States Patent Office 3,124,344
Patented Mar. 10, 1964

3,124,344
AUTOMATIC DOOR OPERATING DEVICE
Takeo Mano, Kawasaki City, Japan, assignor to Kayaba Industry Co., Ltd., Minato-ku, Tokyo, Japan
Filed Dec. 5, 1960, Ser. No. 73,644
9 Claims. (Cl. 268—3)

This invention relates to an automatic door operating device, and more particularly to a device for opening and closing the door of a motor vehicle. The device preferably operates from the subatmospheric pressure developed in the intake manifold of an internal combustion engine used for powering a motor vehicle.

An object of this invention is the provision of a control valve adjacent the position of a motor vehicle operator, whereby said operator may control the opening and closing of any or all the doors of such vehicle.

An additional object of this invention is the provision of a door opening and closing device, controlled by the operator of the vehicle, wherein the door starts to move slowly, speeds up and then is cushioned in the last phase of its movement.

Another object of this invention is the provision of a reciprocating fluid pressure motor attached between the door of a vehicle and its casing and controls within easy reach of the operator whereby one side of a piston in the motor is connected to a source of subatmospheric pressure and atmospheric pressure is present at the other side of said piston.

A further object of the invention is the provision of means under influence of the control means for operating a vacuum motor to open or close a vehicle door, and for releasing or engaging a door latch at a predetermined time.

Still another object of this invention is the provision of a safety control, mounted on a vehicle door and operable by a passenger for opening a door.

These and other objects will appear from a consideration of the following specification taken with the accompanying drawings forming a part thereof.

In the drawings:

FIG. 1 is an elevation, with parts in section, of one form of the invention showing the door partly opened;

FIG. 2 is an axonometric view of the door operating mechanism;

FIG. 3 is a partial elevation showing the door operating lever mechanism in the initial period of door opening;

FIG. 4 is an enlarged fragmentary section on the line 4—4 of FIG. 1;

FIG. 5 is a sectional elevation of the control valve of FIG. 1, taken on the line 5—5 of FIG. 6 and showing the valve in inoperative position;

FIG. 6 is a vertical section through the valve at right angles to FIG. 5;

FIG. 7 is a top view of the valve housing;

FIG. 8 is a view similar to FIG. 5 with the valve in door opening position;

FIG. 14 is a sectional elevation of a modified control valve for the door operating motor;

FIG. 15 is a section on the line 15—15 of FIG. 14;

FIG. 16 is a sectional elevation of a further modification of the device of FIG. 14;

FIG. 17 is a sectional elevation showing the parts of FIG. 16 in a different position;

FIG. 18 is a fragmentary elevation, partly in section, showing some of the parts of FIG. 1, with a different motor control valve, with the valve in door closed position;

FIG. 19 is a section on the line 19—19 of FIG. 18; and

FIG. 20 is a view similar to FIG. 18 with the door controlling valve and motor in door closed position.

Figure 9:
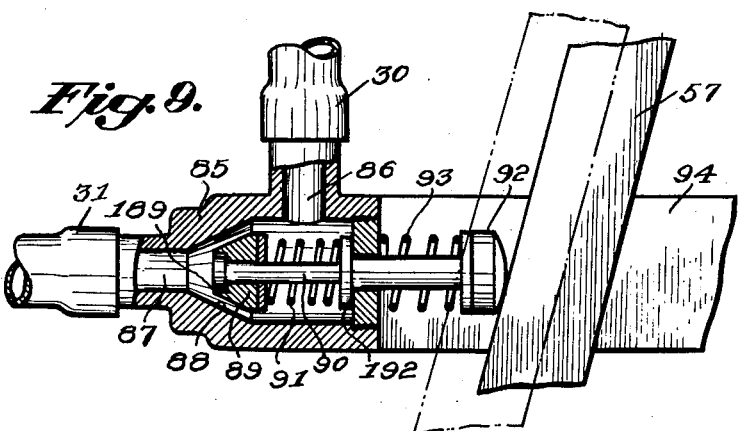
FIG. 9 is a fragmentary elevation view, partly in section, showing a modified form of valve for controlling the fluid ports of the vacuum motor.

Referring now to FIGS. 1 to 8, I show at 22, the intake manifold of an internal combustion motor for operating a motor vehicle. This manifold 22 is connected to a valve 23 by means of a pipe 24. The valve 23 is connected to the door operating motor and the control valve therefor by means of the pipes 25 and 26. The whole operating mechanism is mounted on the door 27, with the exception of the valve 23. A safety valve 28 is mounted on the door 27 and is connected to the pipe 25, whereby the door may be opened by a passenger in an emergency. A pipe 30 connects the valve 28 and the motor valve cylinder 29 which contains a valve, later to be described, for operating the door motor to open the door. A pipe 31 leads from the motor valve cylinder 29 to one end of the motor cylinder 32. The pipe 26, above mentioned leads to the opposite end of the motor cylinder.

The valve 23 is attached to the vehicle dash 33 within easy reach of the operator of the vehicle. This valve comprises a seat 34 and a cover 35. The valve body 36 is somewhat heart shaped and has horns 36' and 36" and is rotatable in the housing or cover 35 and has a lug 37 opposite the valve seat, having a depression 38 therein. There is a depression 39 in the bottom of the valve cover 35. The toggle lever 42 has pointed ends 44 and 45 engaging respectively the depressions 38 and 39. The toggle lever 42 comprises a tube 40 and a rod 41 slidable therein, the whole being surrounded by a compression spring 43 which forces the points 44 and 45 into continuous engagement with the depressions 38, 39, respectively. This toggle causes the valve body 37 to be forced against the seat and also to be forced upwardly as in FIG. 5. On the rear face of the valve body 36 there is a triangular depression 46 which in the inoperative position of FIG. 5 covers only the pipe 24. In door opening position the depression 46 covers pipes 24 and 25, leaving pipe 26 open to atmosphere, as will appear later. In the door closing position of the valve body 36, the pipe 26 is covered and the pipe 25 is open to the atmosphere.

A pair of push buttons 47 and 48 are mounted in the valve cover 35 and engage respectively the horns 36' and 36". When the push button 47 is depressed it pushes on the horn 36' to rotate the valve body 36 in a counter clockwise direction, against the force of the spring 43. This operation covers the pipes 24 and 25 and connects the subatmospheric pressure of the intake 22 to the valve motor 29, which will function in a manner later to be described. If the other push button 48 be depressed, the pipe 25 will be uncovered and the pipe 26 will be connected to the intake manifold 22 to exhaust air from the right hand end of the cylinder 32, as will later be described. If neither push button is depressed the valve body 36 is static in the position of FIG. 5, and both pipes 24 and 25 are open to atmosphere by means of the vent 49 in the valve cover. In this condition the door operating mechanism is inoperative. A plurality of projecting walls 50 guard the push buttons 47, 48 to prevent accidental operation, and to insure normal operation of but one of them at a time.

A somewhat F-shaped frame 51 is suitably installed on the inner side of the vehicle door 27. The motor cylinder 32 is attached to this frame 51 by means of a suitable pin 52, and is free to rotate on said pin. The piston rod 53 is connected by means of a pin 56 to a swinging lever 55 pivotally mounted on the frame 51 by means of a pivot pin 54. The swinging lever 55 underlies the lower portion of the lever 57 which is formed in two parts connected by a sleeve 54' which surrounds the pivot pin 54, and is pivoted intermediate its ends on said pin 54, as best shown in FIG. 2. The levers 55 and 57 are constrained to move together, but may move independently by virtue of the device shown in detail in FIG. 4. A pair of bars 60 lie on either side of the levers 55, 57, in groove 58 on the side of lever 55 and in groove 59 in lever 57. The bars 60 are connected by means of a pin 61 at the outer ends thereof, and by a head 62 at their other ends. A spring 63 is interposed between the head 62 and the levers 55, 57 and tends to restrain the levers 55 and 57 to move together. However, independent movement is also assured under suitable conditions.

The lever 55 operates basically as a lever of the third class, while the lever 57 operates basically a lever of the first class, though portions of its operation here may fall into other classes.

A piston 64 is mounted in the cylinder 32 and is connected with the piston rod 53. Movement of the piston 64 to the left, as in FIG. 1, first causes a slight movement of the lever 55, slightly compressing the spring 63. This operation then causes movement of the lever 57 which will operate in a manner later to be described.

A link 65 is pivotally connected to the upper end of the lever 57 at 66 and to a curved link 68 which is pivotally connected to the door post 67 on which the door 27 is hingedly mounted. As the door 27 and post 67 are no part of my invention, no further description thereof is given.

Movement of the piston 64 to the left as in FIG. 1, places pressure on the link 65, the link 68 and the post 67. As the cylinder is attached to the door 27, through the frame 51, the push exerted against the post 67 causes the door to open.

The motor valve 29 includes a cylinder 70 and a piston valve 71 connected by means of a pitman 72 to the lever 57, by means of the pin 73. The free end of the cylinder 70 is pivotally connected to the frame 51 by means of a pin 74. The air pipe 30 is connected at the opening 75 adjacent the pivot end of the cylinder and to the safety valve 28. The opening 75 is occluded by the piston 71 a short time before the door reaches full open position. The pipe 31 is connected to an opening 76 in the valve cylinder and to the left end of the motor cylinder 32 as seen in FIGS. 1 and 2. With this construction, operation of push button 47, rotates the valve body 36 to connect the pipes 24 and 25 whereby subatmospheric pressure in the intake manifold is available at the opening 75 in the valve cylinder 70. This opening is intermediate the ends of said cylinder and permits the left end of the cylinder 70 and the left end of the motor cylinder 32 to be influenced by low pressure. The piston 64 being thus exposed to subatmospheric pressure on its left and to atmosphere through the pipe 25, as explained hereinbefore, starts to move to the left and first moving the lever 55 to compress the spring 63 slightly. This causes the lever 57 to move. The valve piston 71 following the movement of the lever 57, moves to the left. The lever 57 acting against links 65 and 68 through post 67 causes thrust to be applied to the frame 51 attached to the door 27, to open the door. After sufficient movement of the piston valve 71, the opening 75 is occluded, cutting off the reduced pressure to the cylinder 32. Inertia of the door acting on the valve piston 71 and the motor piston 64 causes continued movement of these pistons which compresses the residual air remaining to the left thereof, and cushions the final movement of the door 27. The pressure of the trapped air may rise to more than one atmosphere, but the pressure on the other side of the piston 64 is at one atmosphere, the piston will reverse slightly and balance the pressure on both sides at one atmosphere. The cushioning above noted prevents slamming of the door and avoids shock which might damage the hinges or twist the post 67.

The safety valve 28 is installed on the door 27 with the handle 77 exposed. This is a regular cock valve, and with the handle in the position illustrated in FIGS. 1 and 2, the port in the valve body is out of communication with the pipes 25 and 30, and the door remains closed. If now the push button 47 be operated, no action takes place as there is no connection between the pipe 24 and the cylinder 70. If a passenger desires to alight, he operates valve handle 77 to the right and connects the pipe 25 with the pipe 30. If the push button 47 be now depressed, the mechanism will operate as described above and the door will be opened.

While many types of door latches are in use and may be used herein, I prefer the one now to be described. I prefer to employ the relative movement of the levers 55 and 57 as above noted to accomplish the unlatching of the door. A bracket 80 is attached to the lever 55 and one end of a flexible wire 81, such as a Bowden wire, is attached to the bracket 80. The wire 81 passes through a casing or tube 82 and the other end of the wire 81 projects beyond the tube 82 and is connected to the tongue piece 83. The tube 82 is connected to the lever 57 by means of a clamp 80' and to the door 27 by means of a bracket and clamp 84. When lever 55 is rotated slightly at the beginning of the operation, it pushes the tongue piece 83 forward, or to the left in FIG. 1, to disengage the door latch. The door then opens in the manner previously described. With the normal operations initiated, the levers 55 and 57 resume the position shown in FIGS. 1 and 2 and the tongue piece returns to the position in these figures.

Figure 10:
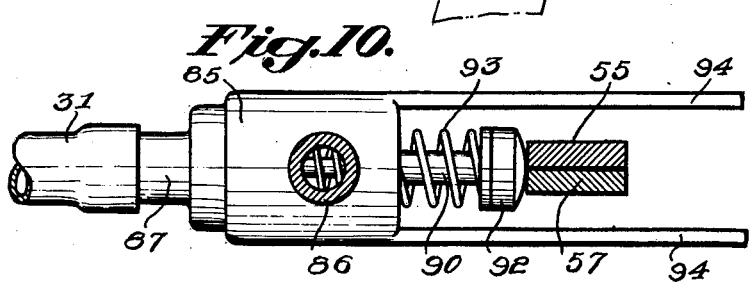
FIG. 10 is a plan view of FIG. 9, with parts in section.

In FIGS. 9 and 10 I show a modified form of motor control valve, which replaces the piston valve 29. Here a valve body 85 has inlet and outlet ports 86 and 87 respectively connected to pipes 30 and 31. Within the valve body is a valve seat 88 and a valve body 89. Within the valve body 89 there is a valve stem 90 having a valve head 189. The stem 90 is surrounded by a spring 91 which engages the valve body 89 and a collar 192 on the stem 90. An enlarged portion of the stem 90 passes through the valve body 85 and is provided with a head 92. This portion of the stem 90 is surrounded by a spring 93 which engages the head 93 and the valve body 85.

The levers 55 and 57 travel between parallel guide bars 94—94 and engage the head 92 to move the valve body 89. When the valve body 89 seats on the valve seat 88, further movement of the levers 55 and 57 moves the valve body 189 into the port 87 to close same and permit compression of the residual air in the cylinder 32 to cushion the door as above explained. As soon as the pressure is equalized, the door stops in open position.

Figures 11, 12:
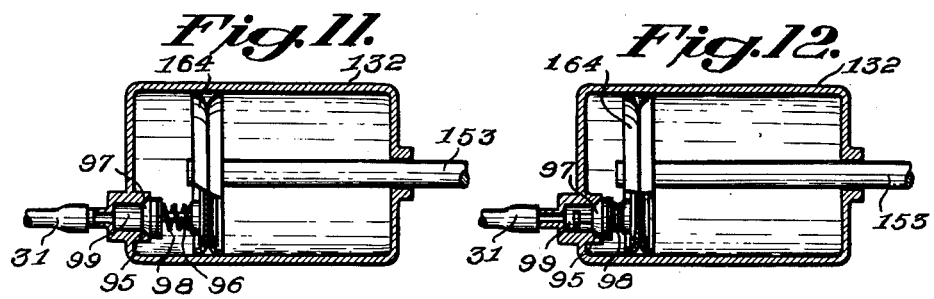
FIG. 11 is a view, in section, of a door operating motor and a modified control therefor showing the valve at the beginning of the operation cycle.
FIG. 12 shows the mechanism of FIG. 10 at the position of maximum door opening.
Figure 13:
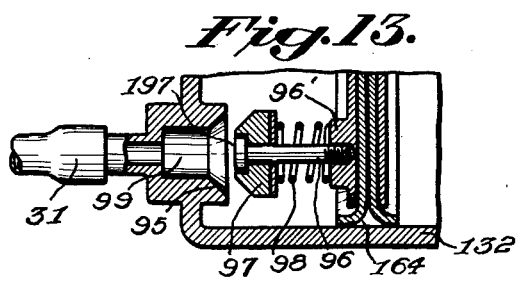
FIG. 13 is an enlarged fragmentary sectional view of the valve means of FIGS. 11 and 12.

A further modification is shown in FIGS. 11, 12 and 13, wherein the cylinder 132 is shown with the piston 164 and the piston rod 153. Here the pipe 31 is connected to a port 99 having a valve seat 95. A valve body 97 mounted on a stem 96 is adapted to seat on the valve seat 95. A spring 98 surrounds the stem 96. The stem 96 is threaded into a plate 96' and the spring exerts pressure on the valve body 97 to hold it against the head 197 and cause the assembly to travel with the piston 164 when the plate 96' is engaged by the same. In operation the valve 97 engages the valve seat 95 shortly before the door 27 reaches full open position, and further travel of the piston 154 causes the head 197 to move into the port 99. This operation cuts off the source of subatmospheric pressure and causes compression of the residual air in the cylinder 164 to cushion the door opening and finally to stop it in open position.

Another form of piston valve is shown in FIGS. 14 to 17 inclusive. Here the valve cylinder 100 is pivoted on the door 27 or the frame 51 by means of the pin 101. Pipes 30 and 31 are connected to diametrically opposite ports 102 and 103 in the cylinder 100, near the left end thereof. Pipe 30 connects the cylinder 100 to the valve 23 and the pipe 31 connects the cylinder 100 to the left end of the cylinder 32. A valve piston 104 is connected on the free end of the pitman 105, which is adapted to be connected to the lever 57 in the same manner as the pitman 72 heretofore described. Pipe 26 is connected to the cylinder 100 by means of the port 105. As the valve piston 104 moves to the left in FIG. 14, it occludes ports 102 and 103, permitting the piston 64 to compress the residual air in the left end of the cylinder 32 to cushion the door opening as previously described.

Spaced from the valve piston 104, on the pitman 105 there is a second piston 109. Also spaced along the cylinder 100, intermediate its ends is a pair of diametrically located ports 106 and 107. The pipe 26 is connected to the port 106, and a pipe 108 is connected to the port 107. A pair of diametrically located axially extending grooves 110 are formed in the piston 109 and are adapted to register with the ports 106 and 107. The pipe 108 connects the cylinder 100 to the right end of the cylinder 32, when the ports 102 and 103 are occluded by the valve piston 104, the grooves 110 restrict flow of air from the atmosphere to the right side of the piston 64 and thus cause a slowing of the movement of the door. FIG. 14 shows the mechanism in the door closed state. When the push button 47 is depressed, the left side of the piston 64 is subjected to subatmospheric pressure through the pipe 26 and the pipe 108 causes the piston to move toward the left. Then ports 102 and 103 are occluded slightly before full open position of the door. At this point the flow of air through the pipes 26 and 108 is reduced. Inertia of the door causes further movement of the piston valves 104 and 109, but the compression in the cylinders 32 and 100 brakes or cushions the door opening, and the door arrives at full open position with a minimum of shock with little or no danger of damage to the hinges or mounting.

To close the door, push button 48 is depressed. This connects pipe 26 to the intake manifold 22 and the source of subatmospheric pressure. This reduced pressure, being connected to the right end of the cylinder 32 by the pipe 108 and the grooves 110, causes the piston to start to the right since the left end is open to atmosphere through the pipes 30 and 31. This starts the door 27 to rotate in the closing direction. As soon as the ports 102 and 103 are uncovered, by this movement being imparted to the lever 57, atmospheric pressure is admitted to the left side of the piston 64 to close the door.

In FIGS. 18 to 20 an additional modification is shown. Here the cylinder 121, of the piston valve assembly 120, is similar to the cylinder 100, and is mounted on the door 27 by means of a pin 122. The air pipes 30 and 31 are connected respectively to the ports 122 and 123 in the cylinder 121, adjacent the rear or left end thereof as seen in FIG. 18. A piston valve 125 is mounted on the pitman 126 in a position to occlude the ports 123 and 124 shortly before the door reaches full open position. The pipe 30 connects to the safety valve 28, and the pipe 31 is connected to the left end of the cylinder 32. The pipes 26 and 127 connect respectively the valve 23 and the right end of the cylinder 32. These pipes are also connected respectively to the parts 128 and 129 in the cylinder 100. As the door starts to close in response to operation of the push button 48, the right end of the piston 64 is subjected to the reduced pressure. The residual slightly higher pressure at the left of the piston 64 causes it to start to move slowly to the right. As soon as the ports 123 and 124 are uncovered, the full atmospheric pressure is applied to the left of the piston 64 and causes the door to close fully. As the valve piston 130 passes the ports 128 and 129, however, the effect of the subatmospheric pressure is reduced. This cushions the door just before its fully closed position. When the valve piston 130 passes the ports 128 and 129, the full atmospheric pressure again is applied in the cylinder 32 to overcome the friction of the door latching means, and to close and latch the door securely.

In this description only one door 27 is mentioned. It is to be understood that this mechanism may be applied to any and/or all doors in a motor vehicle. No modification will be necessary except duplication of the valve 23 and the valve 28.

It is to be understood that though certain modifications have been described, further modification may be made within the skill of the art and the scope of the appended claims.

I claim:

1. In a means for operating the door of a motor vehicle comprising a door, a frame therefor, a fluid pressure motor having a cylinder mounted on said door, said cylinder having a reciprocating piston and piston rod therein, means for connecting one side of said piston to a source of fluid at subatmospheric pressure and admitting fluid at atmospheric pressure at the other side of the piston, a lever system connected to the piston rod and to said door frame, a controlling valve means for controlling at least one of the fluids admitted to said fluid motor, said lever system comprising a pair of superposed levers consisting of a first lever pivoted at one end on said door and being connected at the other end to said piston rod, and a second lever pivoted intermediate its ends on the pivot means for said first lever and having a link connected at one end to one end thereof, said link being connected at its other end to said door frame.

2. The structure as defined in claim 1, wherein the means connecting one side of the piston to a source of subatmospheric pressure and the other side thereof to atmospheric pressure comprises a reversing valve, and wherein the controlling valve comprises a cylinder, a pair of spaced apart valve pistons in said controlling valve cylinder, means connecting said controlling valve cylinder to said reversing valve and means connecting said controlling valve cylinder to either side of said piston.

3. The structure as defined in claim 2, wherein one of said valve pistons is provided with a pair of axially extending grooves adapted to cause reduced flow of one of the fluids.

4. The structure as defined in claim 2, including means constraining said levers to move concurrently, but permitting slight independent movement of one of said levers.

5. The structure as defined in claim 4, wherein the means referred to therein comprises a spring engaging both levers and a frame embracing the levers and the spring, whereby initial movement of the first lever slightly compresses the spring which later causes movement of the second lever.

6. The structure as defined in claim 2, including means connecting said lever system and said controlling valve pistons for moving said controlling valve pistons, means connecting said controlling valve cylinder to said motor cylinder, means connecting said controlling valve cylinder to said source of subatmospheric pressure and having an opening intermediate the ends of said controlling valve cylinder, so located that travel of a valve piston occludes said opening and removes said source from said motor cylinder.

7. The structure as defined in claim 6, comprising a casing, means connecting the casing to the reversing valve, a valve in the casing adapted to be moved by the second lever, to reduce the flow of fluid, and a further valve member adapted upon further movement of the said second lever to cut off flow of fluid whereby door inertia causes compression of the residual fluid to cushion door movement.

8. The structure as defined in claim 1, wherein the means connecting one side of said piston to a source of subatmospheric pressure and the other side of said piston to atmospheric pressure includes a controlling valve cylinder, a valve piston reciprocably mounted in said controlling valve cylinder, means connecting said lever system to said valve piston, a first conduit means connecting said controlling valve cylinder with said source of subatmospheric pressure and a second conduit means connecting said controlling valve cylinder with said motor cylinder, said first conduit means having openings in said controlling valve cylinder, intermediate its ends, so located that the valve piston travels past said opening to remove said source of subatmospheric from said fluid pressure motor.

9. The structure as defined in claim 1, wherein the controlling valve means comprises a valve seat on the fluid motor, a valve member mounted in the cylinder of said motor and engageable by said piston to first move said valve member to remove one source of fluid pressure from said motor and whereby further movement of said piston in response to inertia of the door causes compression of the residual air in the motor cylinder to cushion the door.

References Cited in the file of this patent

UNITED STATES PATENTS

| | | |
|---|---|---|
| 1,639,747 | Nelson | Aug. 23, 1927 |
| 2,726,893 | Zucker | Dec. 13, 1955 |
| 2,926,013 | Van Dongen | Feb. 23, 1960 |